United States Patent [19]

Kildune

[11] Patent Number: 5,554,331
[45] Date of Patent: Sep. 10, 1996

[54] METHOD OF MAKING A LARGE DECORATIVE PANEL

[75] Inventor: Joseph S. Kildune, Salem, N.H.

[73] Assignee: GenCorp Inc., Fairlawn, Ohio

[21] Appl. No.: 428,614

[22] Filed: Apr. 25, 1995

[51] Int. Cl.$^6$ .................. B29C 33/40; B29C 33/42; B29C 59/02
[52] U.S. Cl. ................ 264/161; 264/227; 264/293
[58] Field of Search ................. 264/161, 225, 264/226, 227, 293

[56] References Cited

U.S. PATENT DOCUMENTS

| | | | |
|---|---|---|---|
| 2,982,998 | 5/1961 | Smith et al. | 264/227 |
| 3,379,812 | 4/1968 | Yakovou | 264/227 |
| 3,989,790 | 11/1976 | Bruner et al. | 264/225 |
| 4,381,963 | 5/1983 | Goldstein et al. | 156/245 |
| 4,579,708 | 4/1986 | Rosart | 264/227 |
| 4,656,722 | 4/1987 | Armstrong | 29/527.2 |
| 4,840,764 | 6/1989 | Cummins | 264/102 |
| 4,859,394 | 8/1989 | Benton et al. | 264/225 |
| 4,970,033 | 11/1990 | DeGiovanni et al. | 264/225 X |
| 5,266,257 | 11/1993 | Kildune | 264/224 |
| 5,298,213 | 3/1994 | Shyu | 264/62 |

*Primary Examiner*—Leo B. Tentoni
*Attorney, Agent, or Firm*—Robert F. Rywalski; Larry R. Meenan

[57] ABSTRACT

A method of forming a decorative panel having an embossed decorative indicia. The method includes the steps of forming a decorative design within an impressionable material to provide a positive mold. Then an elastomeric material is cast within the positive mold to provide a negative blanket casting. The negative blanket casting is removed from the positive mold. Next, an epoxy resin containing material is poured over the blanket casting to form an embossing plate having a decorative design substantially identical to the decorative design within the positive mold. Finally, a panel is embossed with the embossing plate under high temperature and pressure to form the decorative panel.

19 Claims, 3 Drawing Sheets

5,554,331

METHOD OF MAKING A LARGE DECORATIVE PANEL

FIELD OF THE INVENTION

This invention relates to a method of making a large decorative panel. More particularly, this invention relates to a method of making a large panel containing a decorative indicia by casting an embossing plate with a decorative design or pattern and then utilizing the embossing plate to emboss the decorative indicia within the panel.

BACKGROUND OF THE INVENTION

This invention is concerned with a method of making large panels containing a decorative indicia. The large panels may be used as wall panels either on the exterior or the interior of a structure. Heretofore, the large panels were typically made of metal such as steel or the like that was stamped with a decorative design. However, metal panels are expensive to manufacture and install. Moreover, the metal panels are easily dented and lose their attractiveness when exposed to the weather.

Although, the many known variations in making panels have been proven to perform satisfactorily under certain conditions, it will be appreciated that there is still a significant need for an improved method of making large panels that is simple and economical.

Accordingly, one object of the present invention is to provide a method of making large panels containing a decorative indicia. Another object of the present invention is to provide a method of making large panels with an unlimited variety of decorative indicia. Yet another object of the present invention is to provide a method of easily and economically reproducing large panels containing substantially the same decorative indicia. Yet another object of the present invention is to provide a method of making a large panel containing a decorative indicia by casting an embossing plate with a decorative design or pattern and then utilizing the embossing plate to emboss the decorative indicia within the panel. Still another object of the present invention is to provide a method of making large panels containing a decorative indicia that are aesthetically appealing, durable and weather resistant.

SUMMARY OF THE INVENTION

Briefly, this invention relates to a method of forming a decorative panel having an embossed decorative indicia. The method includes the steps of forming a decorative design within an impressionable material to provide a positive mold. Then an elastomeric material is cast within the positive mold to provide a negative blanket casting. The negative blanket casting is removed from the positive mold. Next, an epoxy resin containing material is poured over the blanket casting to form an embossing plate having a decorative design substantially identical to the decorative design within the positive mold. Finally, a panel is embossed with the embossing plate under high temperature and pressure to form the decorative panel.

In a preferred embodiment, the impressionable material is plasticized poly(vinyl chloride), the elastomeric material is silicone rubber, the epoxy resin containing material is a high temperature epoxy resin containing material and the panel is formed of rigid poly(vinyl chloride).

BRIEF DESCRIPTION OF THE DRAWINGS

Further features and other objects of the invention will become clear from the following detailed description made with reference to the drawings in which.

DETAILED DESCRIPTION OF THE PREFERRED EMBODIMENTS

Figure 1:
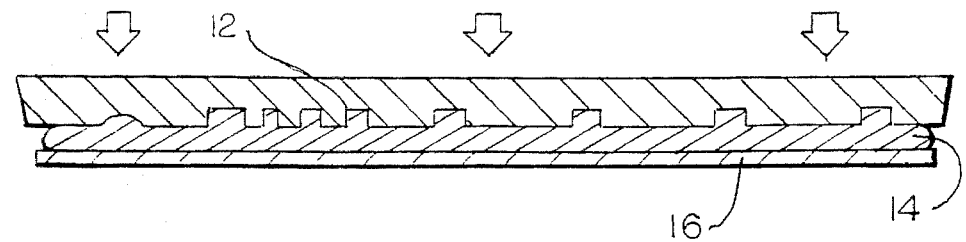
FIG. 1 is a cross-sectional view illustrating an impressionable material having impressed therein a decorative design as shown in FIG. 11.
Figure 2:
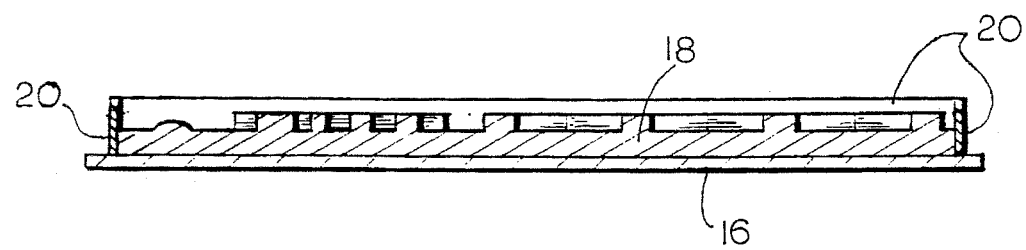
FIG. 2 is a cross-sectional view of FIG. 3 take along line 2—2 illustrating an impressionable material within a form box.
Figure 3:
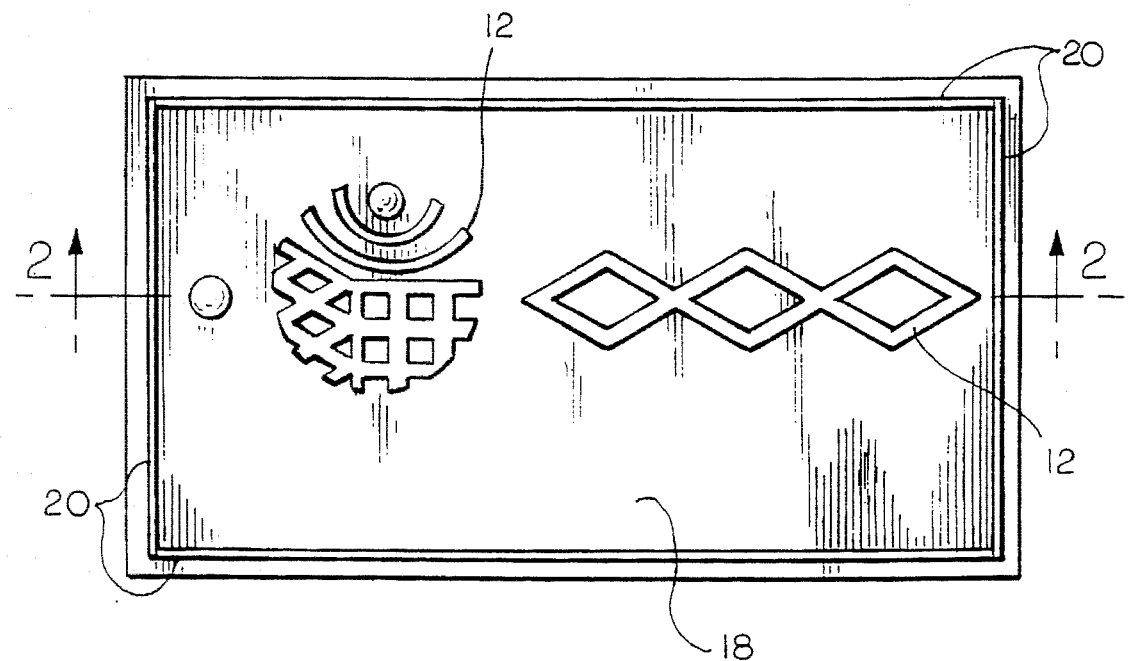
FIG. 3 is a top view of the impressionable material within a form box.
Figure 4:
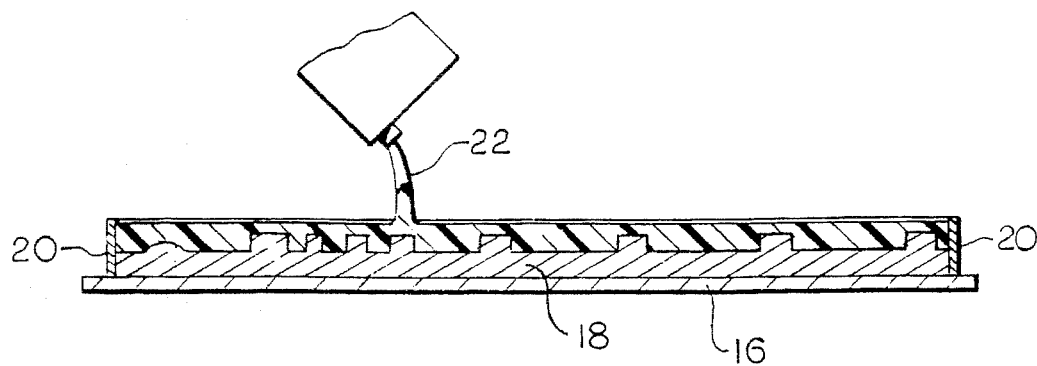
FIG. 4 is a cross-sectional view illustrating the impressionable material within a form box having cast thereon an elastomeric material.
Figure 5:
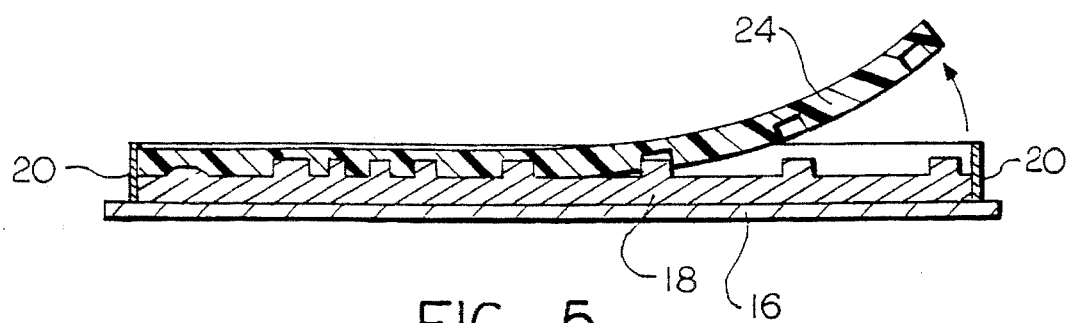
FIG. 5 is a cross-sectional view illustrating the elastomeric material being separated from the impressionable material.
Figure 6:
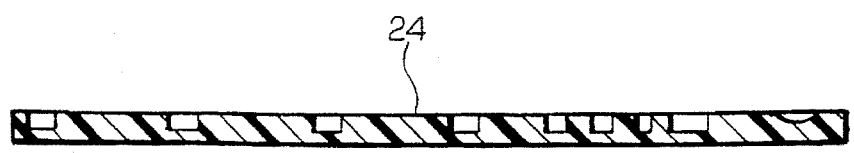
FIG. 6 is a cross-sectional view illustrating the elastomeric material after hardening.
Figure 7:
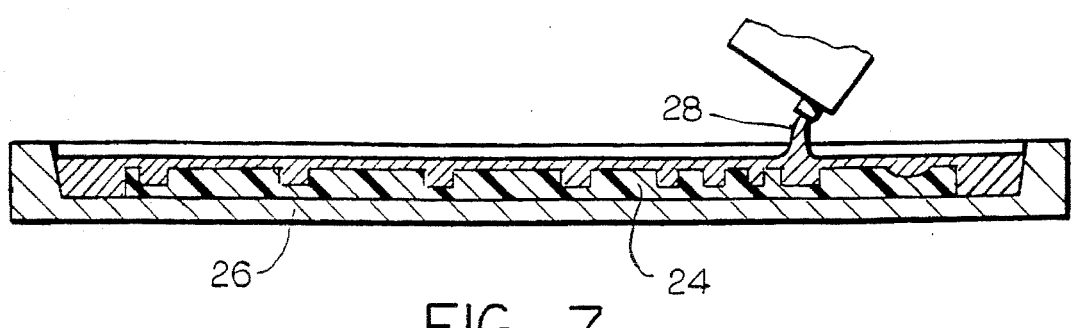
FIG. 7 is a cross-sectional view illustrating the elastomeric material within a form box having cast thereon an epoxy resin containing material to form an embossing plate.
Figure 8:
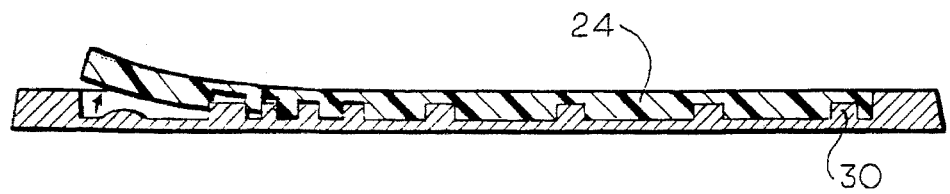
FIG. 8 is a cross-sectional view illustrating the embossing plate being separated from the impressionable material.
Figure 9:
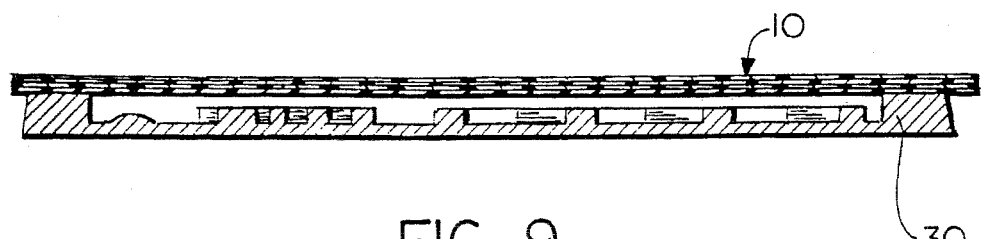
FIG. 9 is a cross-sectional view illustrating a panel positioned over the embossing plate.
Figure 10:
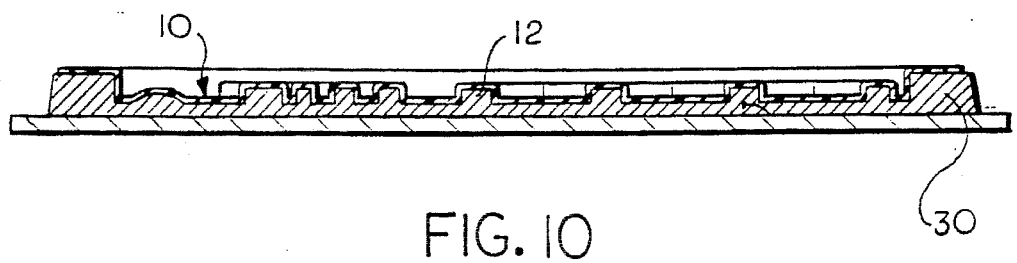
FIG. 10 is a cross-sectional view illustrating a panel which has been embossed by the embossing plate.
Figures 11, 12:
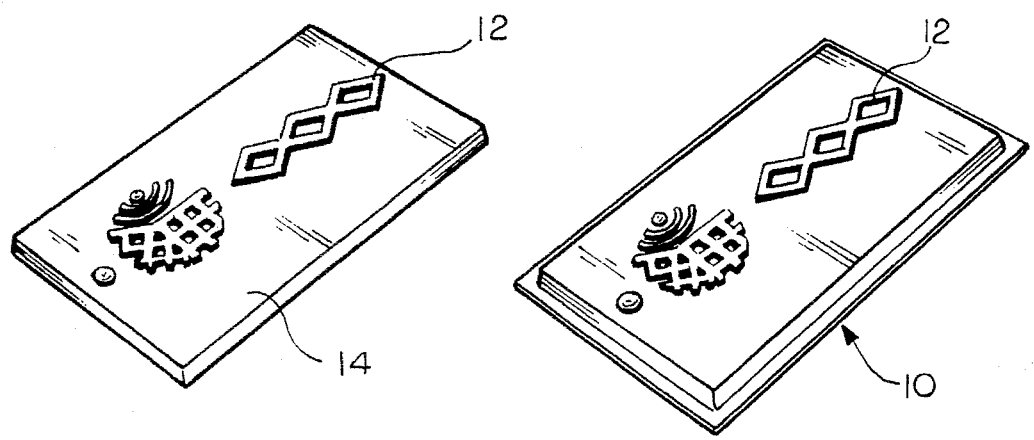
FIG. 11 is a perspective view of a decorative design.
FIG. 12 is a perspective view of a panel after embossing with the embossing plate.

Referring to the drawings, wherein like reference characters represent like elements, FIGS. 1–12 illustrate in sequence the formation of an embossed panel 10 containing a decorative indicia. Although, the invention was primarily developed in connection with the manufacture of large decorative wall panels and it is thus described herein, it will be readily apparent that the process of the present invention may also be used to manufacture decorative panels of a smaller size.

As shown in the drawings, initially, a suitable original design or pattern 12 is formed within an impressionable material 14. The impressionable material 14 is in the nature of what is commonly referred to as modeling clay or as plastic molding compound. The plastic molding compound may be plasticized poly(vinyl chloride). An especially preferred impressionable material 14 is available from Polyform Products Company as their Super Sculpey product line.

The impressionable material 14 or modeling clay is spread as a continuous layer over a supporting base plate 16. The supporting base plate 16 functions as an underlay to support the modeling clay. The modeling clay is soft and readily accepts the design or pattern 12. A negative impression of the original design or pattern 12 is then formed in the modeling clay by pressing the design or pattern into the clay or sculpting the design or pattern in to the clay to form a positive mold 18 or clay plate. The decorative indicia may be recessed or it may raised or a combination thereof. As further described herein the use of an impressionable material 14 to initially configure the design or pattern 12 facilitates the embossing of panels 10 having almost unlimited variations in decorative indicia. The positive mold 18 or clay plate may be of most any size such as 5 feet wide by 10 feet in length or larger. Whichever method is employed, the positive mold 18 is then trimmed to the desired dimensions and sidewalls 20 are then placed around the periphery of the positive mold to form an enclosure having at the bottom thereof the positive mold.

The enclosure containing the bottom positive mold 18 is then cast with an elastomeric material 22 which is dispensed and allowed to flow and mold against the positive mold to form a blanket casting 24 having a surface substantially identical to the original design or pattern 12. The elastomeric material 22 may be of most any suitable castable material which flows readily into the recesses within the positive mold 18 and after hardening is dimensionally stable and easily releases from the positive mold. Silicone rubbers are most suitable for this purpose. One such material is 3112RTV silicone rubber commercially available from Dow Corning. The silicone rubber hardens and cures at room temperature to form a blanket casting 24 having a surface design substantially identical to the original surface design or pattern 12. After hardening the silicone rubber blanket casting is removed from the positive mold 18 and turned over. The inverted silicone rubber blanket casting 24 is then placed inside of a form box 26. The form box 26 functions to enclose the blanket casting 24 and create a confined area for further casting.

A suitable casting material such as a high temperature epoxy resin containing material 28 is then poured over the silicone rubber blanket casting 24 within the form box 26 to create an embossing plate 30. The surface of the embossing plate 30 has a design or pattern 12 substantially identical to the design or pattern of the positive mold 18. A suitable high temperature epoxy resin containing material 28 is EC-423-3 from Ad-Tech Corp. EC-423-3 is a room temperature hardening, aluminum filled, high temperature casting system developed for heat resistant tooling including an epoxy resin containing material and a suitable hardener. The embossing plate 30 is then allowed to harden by curing at room temperature, and subsequently separated from the blanket casting 24.

The embossing plate 30 is then positioned under a thermoplastic panel 10 of one or more sheets of material within a conventional platen press (not shown). The thermoplastic panel 10 is preferably of a weather resistant and durable material. For example, the thermoplastic panel 10 may be formed of one or more sheets of vinyl material such as rigid poly(vinyl chloride) and the like. One such material is Boltaron 4333 commercially available from GenCorp Inc. The thermoplastic panel 10 may be of most any suitable size for use in the platen press. Utilizing high temperature and pressure the platen press forces the embossing plate 30 within the thermoplastic panel 10 thereby forming a panel having a surface containing a decorative indicia substantially identical to the original design or pattern 12. The embossing conditions in the press may be varied as well known in the art depending upon the type of thermoplastic material employed.

The thermoplastic panel 10 may then be trimmed to a size suitable for the desired final intended use of the panel using techniques well known in the art. For example, one contemplated use of the panel is as a decorative wall panel for either exterior or interior use.

The following is a detailed example of the steps used to fabricate a large thermoplastic panel 10 from an embossing plate. It will be understood that the example is not intended to limit the scope of the invention.

EXAMPLE

A thermoplastic panel was formed by stacking six 0.022 inch thick by 50 inch by 124 inch rigid poly(vinyl chloride) sheets one on top of the other. The thermoplastic panel was then placed on top of an embossing plate of a type previously described herein. A silicone coated release paper was placed under the embossing plate to ensure release of the embossing plate from the press after embossing. The thermoplastic panel and embossing plate were placed between two aluminum press plates for insertion into a heated platen press. The thermoplastic panel and embossing plate were processed sequentially in the platen press under the following conditions:

1. preheat to about 330 degrees fahrenheit for approximately 30 minutes at contact pressure;

2. maintain at about 330 degrees fahrenheit for approximately 30 minutes at about 300 pounds hydraulic pressure;

3. maintain at about 330 degrees fahrenheit for approximately 30 minutes at about 1000 pounds hydraulic pressure;

4. cool to about 200 degrees fahrenheit for approximately 20 minutes at about 1500 pounds hydraulic pressure; and then 5. cool to about 90 degrees fahrenheit for approximately 25 minutes at about 2000 pounds hydraulic pressure.

Upon completion of the cycle in the platen press the thermoplastic panel was removed from the platen press and inspected. The panel contained a substantially identical reproduction of the design or pattern from the clay plate as previously described herein.

It will be appreciated that an advantage of the process of the present invention is that by utilizing the casting process a substantially identical reproduction of the design or pattern from the clay plate 18 to an embossing plate 30 is facilitated which may then be utilized to emboss the panel 10. Furthermore, it is also an advantage of the present invention that the embossing plates 30 are of a durable material such that the embossing plates may be repeatedly used in the process of the invention to form an aesthetically pleasing, durable, weather resistant panel.

Having described presently preferred embodiments of the invention, it is to be understood that it may be otherwise embodied within the scope of the appended claims.

What is claimed is:

1. A method of forming a decorative thermoplastic panel having an embossed decorative indicia comprising the steps of:

a) forming a decorative design within an impressionable material to provide a positive mold;

b) casting an elastomeric material within the positive mold to provide a negative blanket casting;

c) removing the blanket casting from the positive mold;

d) pouring a casting material over the blanket casting to form an embossing plate having a decorative design substantially identical to the decorative design within the positive mold;

e) embossing the thermoplastic panel with the embossing plate under high temperature and pressure to form the decorative thermoplastic panel.

2. The method of claim 1 wherein the impressionable material is modeling clay.

3. The method of claim 1 wherein the impressionable material is plastic molding compound.

4. The method of claim 1 wherein the impressionable material is plasticized poly(vinyl chloride).

5. The method of claim 1 wherein the impressionable material is spread as a continuous layer over a supporting base plate and then a negative impression of the decorative design is formed into impressionable material to form the positive mold.

6. The method of claim 5 wherein the positive mold is trimmed to a desired size and then sidewalls are placed around a periphery of the positive mold to form an enclosure having at the bottom thereof the positive mold.

7. The method of claim 6 wherein the elastomeric material is a material which flows readily into the recesses within the positive mold and after hardening is dimensionally stable and easily releases from the positive mold.

8. The method of claim 7 wherein the elastomeric material is a silicone rubber.

9. The method of claim 8 wherein the blanket casting is placed inside of a form box to enclose the blanket casting and create a confined area for further casting.

10. The method of claim 9 wherein the casting material is a high temperature epoxy resin containing material.

11. The method of claim 9 wherein the casting material is a room temperature hardening, aluminum filled, high temperature casting system including an epoxy resin containing material and a hardener.

12. The method of claim 11 wherein the thermoplastic panel is formed of rigid poly(vinyl chloride).

13. A method of forming a large decorative thermoplastic panel having an embossed decorative indicia comprising the steps of:

a) forming a decorative design within an impressionable material to provide a positive mold;

b) trimming the positive mold to a desired size and then placing sidewalls around a periphery of the positive mold to form an enclosure having at the bottom thereof the positive mold;

c) casting an elastomeric material within the positive mold to provide a negative blanket casting;

d) removing the blanket casting from the positive mold;

e) placing the blanket casting inside of a form box to enclose the blanket casting and create a confined area for further casting;

f) pouring a casting material over the blanket casting to form an embossing plate having a decorative design substantially identical to the decorative design within the positive mold;

g) separating the embossing plate from the blanket casting; and h) embossing a thermoplastic panel with the embossing plate under high temperature and pressure to form the decorative thermoplastic panel.

14. The method of claim 13 wherein the impressionable material is plasticized poly(vinyl chloride).

15. The method of claim 13 wherein the elastomeric material is a silicone rubber.

16. The method of claim 13 wherein the casting material is a high temperature epoxy resin containing material.

17. The method of claim 13 wherein the thermoplastic panel is formed of rigid poly(vinyl chloride).

18. A method of forming a large decorative thermoplastic panel having an embossed decorative indicia comprising the steps of:

a) spreading an impressionable material as a continuous layer over a supporting base plate and then forming a negative impression of a decorative design within the impressionable material to provide a positive mold;

b) trimming the positive mold to a desired size and then placing sidewalls around a periphery of the positive mold to form an enclosure having at the bottom thereof the positive mold;

c) casting a silicone rubber within the positive mold to provide a negative blanket casting;

d) removing the blanket casting from the positive mold;

e) placing the blanket casting inside of a form box to enclose the blanket casting and create a confined area for further casting;

f) pouring a high temperature casting material over the blanket casting to form an embossing plate having a decorative design substantially identical to the decorative design within the positive mold;

g) separating the embossing plate from the blanket casting; and h) embossing a thermoplastic panel with the embossing plate under high temperature and pressure to form the decorative thermoplastic panel.

19. The method of claim 18 wherein the high temperature casting material is a room temperature hardening, aluminum filled, high temperature casting system including an epoxy resin containing material and a hardener.

\* \* \* \* \*